Nov. 11, 1969  F. S. HYER ET AL  3,477,533
WEIGHING SCALE MECHANISM
Filed Nov. 21, 1967
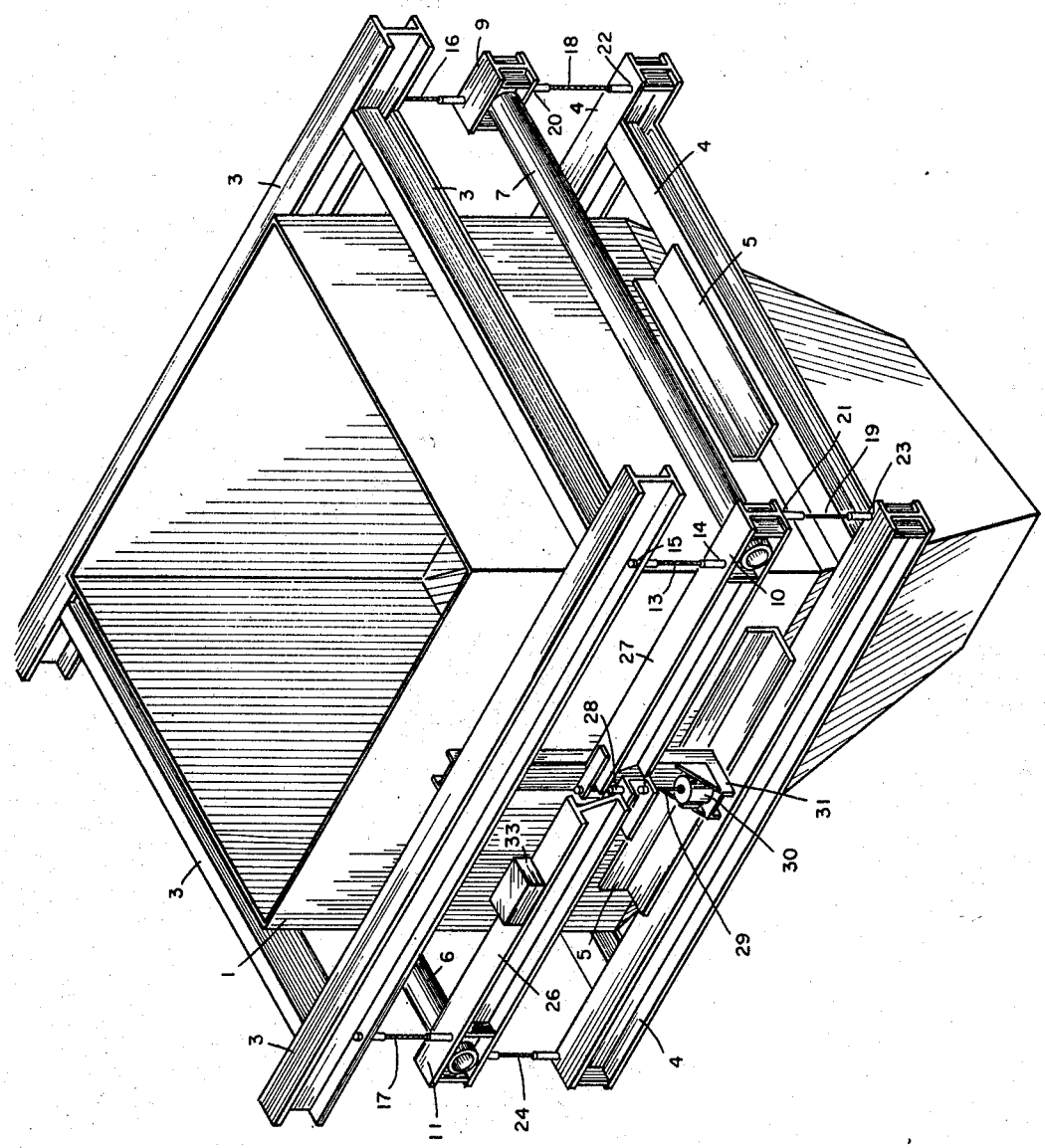
INVENTORS
FRANK S. HYER
PETER J. TOLAN
BY
ATTORNEY.

United States Patent Office 3,477,533
Patented Nov. 11, 1969

3,477,533
WEIGHING SCALE MECHANISM
Frank S. Hyer, Duxbury, and Peter J. Tolan, Scituate, Mass., assignors to Cutler-Hammer, Inc., Milwaukee, Wis., a corporation of Delaware
Filed Nov. 21, 1967, Ser. No. 684,701
Int. Cl. G01g 1/12
U.S. Cl. 177—220                               3 Claims

ABSTRACT OF THE DISCLOSURE

A weighing apparatus having a weigh frame with equalization and force transformation linkages all suspended by vertically disposed relatively inextensible but universally flexible cables or the like which are capable of transmitting only substantially purse tension forces.

BACKGROUND OF THE INVENTION

Field

The invention pertains to weighing scales of the type in which a system of interconnected linkages additively combines the forces at three or more suspension points on a load frame, and transforms the total to a resultant force generally a fraction of, but proportional to, the load to be weighed. The resultant force is applied to a force measuring device such as a load cell to operate an indicator or control device.

Prior art

Prior art scales of the type to which this invention pertains, using flexibly supported load receiving means and force transformation linkages, are illustrated by the following United States Patents: 197,489, Onslow, Nov. 27, 1877; 2,741,472, Thayer et al., April 10, 1956; 2,961,231, Kucera, Nov. 22, 1960.

The above patents represent the most pertinent prior art presently known to applicant. All show lever arrangements which are flexibly suspended to avoid the use of friction bearings which are susceptible to sticking, or knife edge bearings which are subject to breakage owing to high unit pressures at the lines of contact.

Onslow discloses thin metal bands cooperating with rollers to support the platform and actuate a weigh beam. Thayer discloses a basically similar structure using flexure plates which are functional counterparts of the metal bands of Onslow. Both arrangements can be designed to operate satisfactorily in many applications covering load ranges from a few pounds to many thousands of pounds. However, the metal bands or flexure plates exhibit certain undesirable properties which dictate that care be exercised in their application. In either case the member represents a single element elastic flexure type pivot which is capable of transmitting undesirable bending moments from the supporting structure to the linkages whenever such forces present themselves. Knife edge scales which also have a limited degree of freedom are likewise vulnerable. The occurrence of such forces as well as their detrimental effects are well understood by those engaged in scale design and application and most frequently arise from strains accompanying the moving about of heavy machinery, the filling and emptying of large hoppers and bins and structural expansion or contraction due to temperature changes. Because these members are essentially springs, they must be made of special alloys to eliminate hysteresis as well as undesirable temperature effects.

The Kucera patent discloses a cattle weighing scale with a platform supported at its corners on levers extending to the center of the structure and connected together there to a weigh beam arranged to actuate a spring balance. The platform and levers are interconnected by cables that are trained around blocks, i.e. pulleys, to permit motion of the platform and weigh beam. Of considerable importance is that the Kucera cable are subjected to local surface compression in the areas of contact with the blocks, i.e. pulleys. Such forces can become very sizable under heavy or shock loads and can create a varying and unpredictable deformation of the cable cross section resulting in displacement of the neutral axis thereof. This effect changes the mechanical advantage of the scale and degrades its accuracy whenever the load is allowed to exceed some relatively low limit. Further, there is no apparent way to design the Kucera device to provide an open central space for a load receiving structure such as a hopper which can be loaded from above and unloaded from below, as required in many plant installations.

Summary

According to this invention, all articulate parts of the scale mechanism are supported by relatively inextensible but universally transversely flexible suspension members that are arranged to hang freely vertical throughout their lengths under all operating conditions, thereby avoiding any appreciable spring or hysteresis effects, variations in mechanical advantage, or binding due to imperfect levelling. The term "relatively inextensible" as used herein is intended to mean that the element so characterized will not, under the maximum tensile strength which it will encounter within the design capability of the scale, including shock and overload, elongate more than a negligibly small fraction of the total length of said element. An example of such an element is a steel cable formed of wires twisted in ordinary rope formation.

Three or more such suspension upper members extend from a support frame to a floating intermediate structure. Three or more similar lower suspension members support a weigh frame from the intermediate structure, which consists of two torque transmitting members adjacent opposite sides of the weigh frame interconnected by equalizing arms and a flexible link. The intermediate structure combines the tension forces in the suspension members to produce a single resultant force that is proportional to the weight of the load on the weigh frame. The resultant force is applied by a lever, which may be one of the equalizing arms or a separate arm secured to one of the torque transmitting members, to a force measuring device.

The force measuring device is of a known type wherein a sensing element is displaced a short distance, typically one tenth inch or less, throughout its total operating range. As a result of this small displacement and the mechanical advantage of the lever coupled to the measurement device, the maximum displacement of any of the suspension members is extremely small, say one hundredth inch. Accordingly, there is substantially no rotation of the torque transmitting members and no appreciable bending or other transverse force on the suspension members. Because the mechanism measures essentially force, rather than displacement, its calibration is not affected by overloads or shocks that stretch the suspension members by moderate amounts, even in excess of their maximum displacement during normal weighing operation.

Further objects of the invention, other than those indicated by the foregoing, are to provide a type of scale mechanism that can be readily designed and fabricated using well-known and commonly available structural elements, and that is adaptable to through-feed load receiving devices such as hoppers and tilting bucket arrangements.

BRIEF DESCRIPTION OF THE DRAWINGS

The single figure of the drawing is an isometric view of a scale mechanism illustrating a preferred embodiment of the invention.

DESCRIPTION OF THE PREFERRED EMBODIMENT

As shown in the drawing a hopper 1 is adapted to receive the load to be weighed. After weighing, the load may be discharged by opening a valve or gate at the bottom of the hopper 1. A support frame 3 surrounds but does not touch the upper part of the hopper, and is adapted to be mounted on a base or other supporting structure, not shown. A weigh frame 4, generally similar to the support frame, surrounds the hopper 1 and is secured to it by angle members 5. Two torque transmitting members 6 and 7 are disposed between the two frames, near opposite sides of the weigh frame 4 and parallel to each other. The member 7 comprises a rigid tubular body provided at its ends with relatively short transversely extending parts 9 and 10. The member 6 has similar end parts, one of which is visible in the drawing and is designated by the reference numeral 11.

A flexible cable 13 is secured at its lower end to a point 14 on the part 10, and at its upper end to a point 15 on the support frame 3 directly above the point 14. For this purpose, the cable may be provided with conventional threaded fittings swaged on its ends and secured in holes in the structure at points 14 and 15 by machine bolts. A cable 16 is similarly secured to corresponding points on end part 9 and the support frame. Cables 13 and 16, herein referred to as upper suspension members, support the torque transmitting member 7. The torque transmitting member 6 is similarly supported by a cable 17 and another cable not visible in the drawing.

Cables 18 and 19 are connected from corresponding points 20 and 21 on parts 9 and 10 to respective points 22 and 23 on the weigh frame 4 directly below points 20 and 21. Cables 18 and 19, referred to as lower suspension members, support one side of the weigh frame 4. The other side of the weigh frame is similarly supported by a cable 24 and another cable not visible in the drawing.

Equalizer arms 26 and 27 are secured to the torque transmitting members 6 and 7 respectively, and extend horizontally toward each other to a region midway between the two torque members. The equalizer arms may be formed integrally with the parts 11 and 10, as shown. The adjacent ends of the equalizer arms are connected to each other by a vertically disposed cable 28, similar to the suspension cables. Another cable 29 connects the arm 26 to a load cell 30, which is suppotred on a bracket 31 secured to the support frame 3.

The load cell 30 is of any conventional type that provides an electrical output representing the force (in this case tension) applied to it with substantially negligible mechanical displacement of its sensitive element by said force. Typically such a load cell consists of a precisely constructed tension spring having a stiffness of say 10,000 pounds per inch and designed to operate with loads up to 1000 pounds, corresponding to a maximum displacement of one tenth inch, and an electrical micrometer device such as a linear variable differential transformer (LVDT). The amplitude of the output of the LVDT is zero when the spring is under some small initial tension, such as 50 pounds, and is nominally linearly proportional to any increase in tension above that initial value.

All of the suspension cables are disposed vertically throughout their lengths. The axes of the upper cables 15 and 16 define a vertical plane parallel to the body of the torque transmitting member 7. The lower cables 18 and 19 similarly define another vertical plane, parallel to that of cables 15 and 16 but spaced outwardly from it. Owing to this relationship, tension in the cables, resulting from the weight of the weigh frame 4 and hopper 1 and its contents, tends to rotate the torque transmitting member 7 in a clockwise direction as viewed from the foreground of the drawing. The upper and lower suspension cables, including 17 and 24, at the opposite side of the structure are similarly arranged to tend to rotate the torque transmitting member 6 counter clockwise. Accordingly, the adjacent ends of the equalizer arms 26 and 27 tend to move upwardly. The upward force on arm 27 is added to that on arm 26 by way of the connecting cable 28, and the sum of said forces is applied as tension to the load cell 30 by cable 29. This tension is directly proportional to the total downward force exerted by the weigh frame on the lower suspension cables, being related thereto by a constant factor referred to herein as the mechanical advanatge. The mechanical advantage is numerically equal to the horizontal distance between the planes of the upper cables and the axes of connecting cables 28 and 29, divided by the horizontal distance between the vertical planes of the respective upper and lower suspension cables.

In a scale designed for a capacity of five tons, the mechanical advantage would typically have a value of ten. Under full load, the upward displacement of the ends of the arms 26 and 27 would be about one tenth inch, and the downward displacement of the weigh frame would be 0.01 inch. The corresponding rotation of the torque transmitting members 6 and 7 is so slight that the suspension cables will experience no perceptible stress other than tension.

The accuracy of a load cell is usually specified or guaranteed as some percentage (say 0.1%) of its maximum capacity. Thus a 1000 pound load cell would have a maximum error of one pound, and a scale using such a load cell with a mechanical advantage of ten would have a maximum error of ten pounds.

Tare weight, i.e. the weight of the hopper 1 and weigh frame 4, will produce a corresponding tension on the load cell, generally in excess of the small initial tension that would cause it to produce zero output. The resultant output, with no weigh load on the scale, could be balanced out electrically in known manner. Such electrical balancing would have the effect of reducing the operating range of the load cell by a corresponding amount.

Since the accuracy of the load cell is specified in terms of its maximum capacity, any reduction of its effective capacity by electrical tare compensation will correspondingly degrade the accuracy of the scale. Accordingly, it is preferred to employ mass-to-mass tare compensation by means of a weight 33 on the equalizer arm 26. The mass of the weight and its position on the arm are adjusted to make the load cell produce zero output when the hopper 1 is empty.

Shock loads greatly exceedingly the rated capacity can stretch the suspension cables to some extent. However, the mechanical advantage will remain unchanged because the cables remain in the same vertical planes, and the scale calibration is unaffected.

Foundation strains such as are encountered in the vicinity of heavy moving machinery will tend to cause moderate misalignment of the support frame. Such misalignments cannot cause binding of the mechanism or change its calibration, because the suspension cables will remain vertical and under substantially pure tension stress.

We claim:

1. A weighing scale mechanism including a support frame, a weigh frame, a pair of rigid torque transmitting members disposed in spaced parallel relationship between said frames adjacent laterally opposite sides thereof, a pair of equalizer arms each extending transversely from one of said torque transmitting members toward the other, means for suspending said weigh frame from said torque transmitting members and said members from said support frame, means for interconnecting said equalizer arms, a force measurement device, and means for applying a resultant force to said force measurement device, wherein the improvement comprises the structure of said suspension, interconnection, and force applying means as follows:

(a) transverse parts at the ends of said torque transmitting members, each of said parts extending horizontally below a respective point on said support frame to one side of the axis of the respective torque transmitting member and above a respective point on said weigh frame to the other side of said axis, (b) relatively inextensible but transversely universally yieldable upper suspension members extending vertically throughout their lengths from said points on said support frame to points directly thereunder on said parts at the ends of said torque transmitting members, (c) lower suspension members similar to said upper suspension members extending vertically throughout their lengths from said points on said weigh frame to points directly thereabove on said parts at the ends of said torque transmitting members.

(d) a flexible inextensible member similar to said suspension members connected between said equalizer arms and extending vertically throughout its length from a point on one of said arms to a point directly thereunder on the other of said arms, and (e) a further inextensible member similar to said suspension members connected to one of said torque transmitting members and extending vertically throughout its length for connection to said force measurement device.

2. The invention set forth in claim 1, wherein said force measurement device is of a type that responds to the maximum force within its measurement range with a displacement that is substantially less than one percent of the distance between said planes defined by said suspension members, and the mechanical advantage between said last mentioned torque transmitting member and said device is such that said suspension members encounter substantially no perceptible bending in normal operation of the scale mechanism.

3. The invention set forth in claim 1, wherein said force measurement device is of a type that provides an output signal of a magnitude nominally proportional to the force applied to the device, with an accuracy that is customarily guaranteed as a certain percentage of the maximum capacity of the device, further including a tare counterbalance weight and means coupling said weight to one of said torque transmitting members to produce a moment tending to rotate said member in the opposite direction to that in which tension on said suspension members tends to rotate it, the mass of said weight and the mechanical advantage of its coupling to said torque transmitting member being so proportioned to make said force measurement device produce zero output in the absence of load on said load receiving means.

References Cited

UNITED STATES PATENTS

| | | | |
|---|---|---|---|
| 197,489 | 11/1877 | Onslow | 177—247 |
| 829,299 | 8/1906 | Skidmore | 177—134 |
| 2,736,549 | 2/1956 | Paul. | |
| 2,741,472 | 4/1956 | Thayer et al | 177—215 |
| 2,961,231 | 11/1960 | Kucera | 177—230 |
| 3,198,272 | 8/1965 | Allen et al | 177—165 X |

FOREIGN PATENTS 537,254   5/1922   France.

RICHARD B. WILKINSON, Primary Examiner

G. H. MILLER, Jr., Assistant Examiner

U.S. Cl. X.R.

177—230, 165